US012639143B2

(12) United States Patent
Nagar et al.

(10) Patent No.: US 12,639,143 B2
(45) Date of Patent: May 26, 2026

(54) FAULT INJECTION FOR BUILDING FINGERPRINTS

(71) Applicant: International Business Machines Corporation, Armonk, NY (US)

(72) Inventors: Seema Nagar, Bangalore (IN); Ruchi Mahindru, Elmsford, NY (US); Harshit Kumar, New Delhi (IN); Mudit Verma, New Delhi (IN); Tuan Minh Hoang Trong, Jackson Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 99 days.

(21) Appl. No.: 18/610,536

(22) Filed: Mar. 20, 2024

(65) Prior Publication Data

US 2025/0298680 A1    Sep. 25, 2025

(51) Int. Cl.
*G06F 11/34* (2006.01)
*G06F 11/07* (2006.01)

(52) U.S. Cl.
CPC ...... *G06F 11/0709* (2013.01); *G06F 11/3419* (2013.01); *G06F 11/3447* (2013.01); *G06F 11/3457* (2013.01)

(58) Field of Classification Search
CPC ............. G06F 11/3447; G06F 11/2257; G06F 11/2263; G06F 11/3457; G06F 11/302; G06F 11/07; G06F 11/0709
See application file for complete search history.

(56) References Cited

U.S. PATENT DOCUMENTS

| | | | |
|---|---|---|---|
| 9,753,826 B2 | 9/2017 | Deng et al. | |
| 9,842,045 B2 | 12/2017 | Heorhiadi et al. | |
| 10,678,665 B2 | 6/2020 | Shmouely et al. | |

(Continued)

FOREIGN PATENT DOCUMENTS

CN      110389892 A    10/2019

OTHER PUBLICATIONS

Du, et al., "Anomaly Detection and Diagnosis for Container-based Microservices with Performance Monitoring," Aug. 30, 2018.

(Continued)

*Primary Examiner* — Yolanda L Wilson
(74) *Attorney, Agent, or Firm* — Amin, Turocy & Watson, LLP

(57) ABSTRACT

Systems, methods, and techniques that facilitate application fingerprint generation are provided. One or more embodiments described herein can comprise a computer-implemented method comprising determining, by a device operatively coupled to a processor, fault proneness of one or more microservices regarding one or more fault categories, generating, by the device, an ordered seed set of the one or more microservices based on the determined fault proneness, generating, by the device, an augmented ordered seed set of the one or more microservices based on topological relationships of the one or more microservices and based on the ordered seed set, and building, by the device, a set of one or more patterns of resource constraint faults and a set of one or more patterns of entity experience faults based on the augmented ordered seed set of the one or more microservices.

20 Claims, 9 Drawing Sheets

(56) References Cited

U.S. PATENT DOCUMENTS

| | | | |
|---|---|---|---|
| 10,684,940 B1 | 6/2020 | Kayal et al. | |
| 2021/0374025 A1 | 12/2021 | Guan | |
| 2022/0004448 A1* | 1/2022 | Chen | G06N 5/04 |
| 2022/0172067 A1* | 6/2022 | Kang | G06N 3/045 |
| 2023/0087837 A1* | 3/2023 | Hwang | G06N 3/048 |
| | | | 706/12 |
| 2023/0198877 A1* | 6/2023 | Dickgiesser | G06F 11/302 |
| | | | 709/224 |
| 2024/0241978 A1* | 7/2024 | Chopra | G06F 21/6218 |
| 2024/0330093 A1* | 10/2024 | Shwartz | G06F 11/079 |

OTHER PUBLICATIONS

Wang, et al., "Fault Injection Based Interventional Causal Learning for Distributed Applications," Proceedings of the AAAI Conference on Artificial Intelligence, 37(13), 15738-15744. https://doi.org/10.1609/aaai.v37i13.26868, Published Sep. 6, 2023.

Cui, et al., "Feedback-based, Automated Failure Testing of Microservice-based Applications," arXiv:1908.06466v2 [cs.SE] Aug. 20, 2019.

Lee, et al., "Optimal Online Liveness Fault Detection for Multilayer Cloud Computing Systems," Published in: IEEE Transactions on Dependable and Secure Computing ( vol. 19, Issue: 5, Sep. 1-Oct. 2022), Date of Publication: Jul. 29, 2021, Doi: 10.1109/TDSC.2021.3100680.

Joshi, et al., "PREFAIL: a programmable tool for multiple-failure injection," OOPSLA '11: Proceedings of the 2011 ACM international conference on Object oriented programming systems languages and applications, Oct. 2011, pp. 171-188, https://doi.org/10.1145/2048066.2048082.

Nivitha, et al., "Fault Diagnosis for Uncertain Cloud Environment through Fault Injection Mechanism," Published in: 2020 4th International Conference on Intelligent Computing and Control Systems (ICICCS), Date of Conference: May 13-15, 2020, Doi: 10.1109/ICICCS48265.2020.9121168.

* cited by examiner

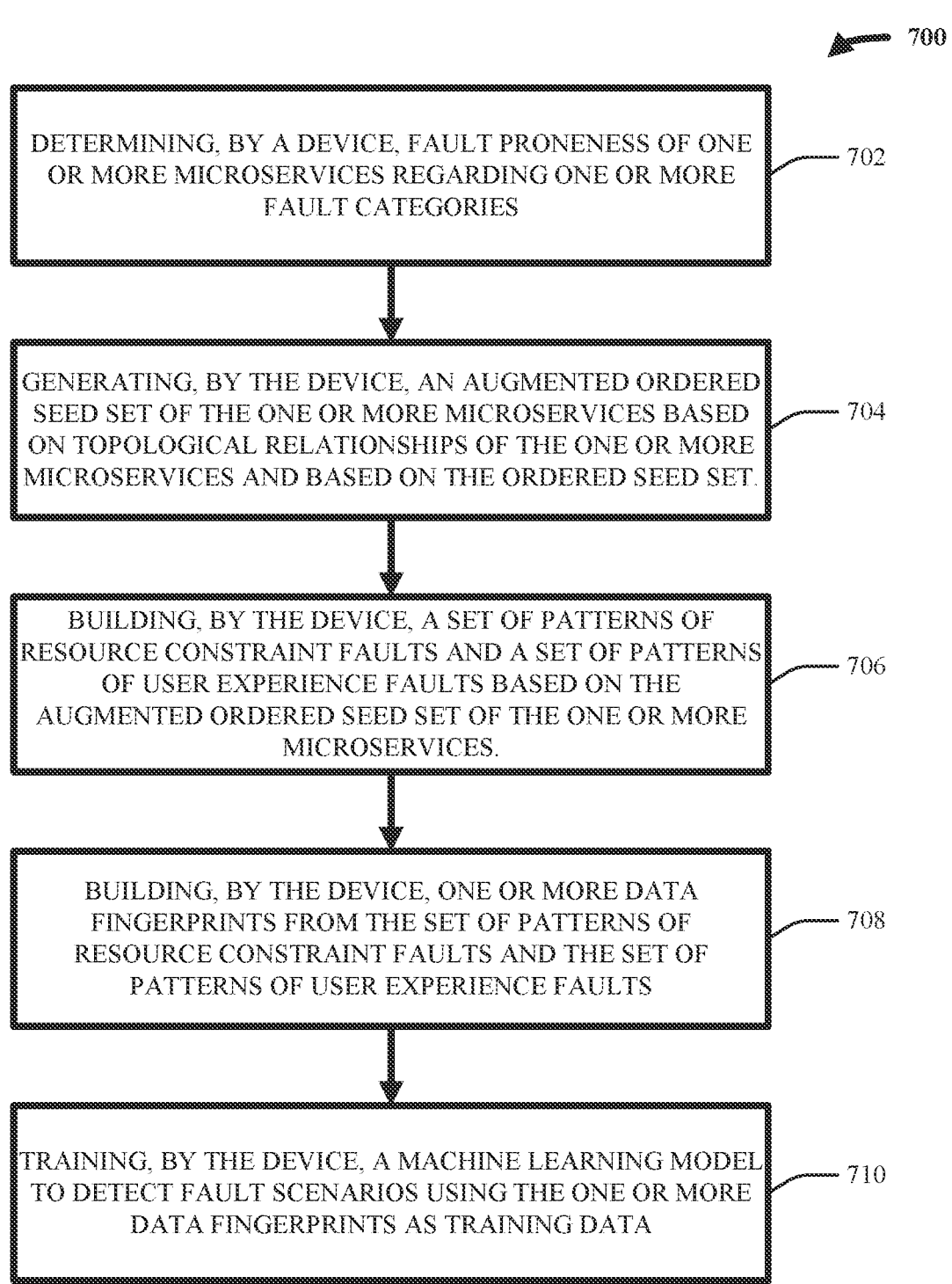

700

DETERMINING, BY A DEVICE, FAULT PRONENESS OF ONE OR MORE MICROSERVICES REGARDING ONE OR MORE FAULT CATEGORIES — 702

GENERATING, BY THE DEVICE, AN AUGMENTED ORDERED SEED SET OF THE ONE OR MORE MICROSERVICES BASED ON TOPOLOGICAL RELATIONSHIPS OF THE ONE OR MORE MICROSERVICES AND BASED ON THE ORDERED SEED SET. — 704

BUILDING, BY THE DEVICE, A SET OF PATTERNS OF RESOURCE CONSTRAINT FAULTS AND A SET OF PATTERNS OF USER EXPERIENCE FAULTS BASED ON THE AUGMENTED ORDERED SEED SET OF THE ONE OR MORE MICROSERVICES. — 706

BUILDING, BY THE DEVICE, ONE OR MORE DATA FINGERPRINTS FROM THE SET OF PATTERNS OF RESOURCE CONSTRAINT FAULTS AND THE SET OF PATTERNS OF USER EXPERIENCE FAULTS — 708

TRAINING, BY THE DEVICE, A MACHINE LEARNING MODEL TO DETECT FAULT SCENARIOS USING THE ONE OR MORE DATA FINGERPRINTS AS TRAINING DATA — 710

GENERATING, BY A DEVICE, ONE OR MORE FINGERPRINTS — 802

TRAINING, BY THE DEVICE, AN AIOS MODEL WITH THE FINGERPRINTS — 804

OBSERVING, BY THE DEVICE, RUNTIME DATA OF THE APPLICATION — 806

N

DOES THE AIOS MODEL RECOGNIZE THE RUNTIME DATA? — 808

Y

GENERATING, BY THE DEVICE, A NOTIFICATION OF THE DETECTED ANOMALIES — 810

COLLECTING, BY THE DEVICE, APPLICATION USAGE DATA — 812

900

COMPUTER 901

PROCESSOR SET 910

PROCESSING CIRCUITRY 920 | CACHE 921

COMMUNICATION FABRIC 911

VOLATILE MEMORY 912

PERSISTENT STORAGE 913

OPERATING SYSTEM 922

FINGERPRINT GENERATION CODE

980

PERIPHERAL DEVICE SET 914

UI DEVICE SET 923 | STORAGE 924 | IoT SENSOR SET 925

NETWORK MODULE 915

WAN 902

END USER DEVICE 903

REMOTE SERVER 904

REMOTE DATABASE 930

PRIVATE CLOUD 906

GATEWAY 940

PUBLIC CLOUD 905

CLOUD ORCHESTRATION MODULE 941 | HOST PHYSICAL MACHINE SET 942

VIRTUAL MACHINE SET 943 | CONTAINER SET 944

FIG. 9

FAULT INJECTION FOR BUILDING FINGERPRINTS

BACKGROUND

The subject disclosure relates to microservice applications, mathematical representations, data fingerprints, and machine learning.

Microservice applications comprise multiple microservices working in concert as part of a larger application. Machine learning systems are increasingly being utilized to monitor microservice applications and detect anomalous operating behaviors.

The above-described background description is merely intended to provide a contextual overview regarding detection of anomalous states of microservice applications and is not intended to be exhaustive.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, and/or computer program products that facilitate generation of application fingerprints through fault injection are provided.

According to an embodiment, a computer-implemented method is provided. The computer-implemented method comprises determining, by a device operatively coupled to a processor, fault proneness of one or more microservices regarding one or more fault categories; generating, by the device, an ordered seed set of the one or more microservices based on the determined fault proneness; generating, by the device, an augmented ordered seed set of the one or more microservices based on topological relationships of the one or more microservices and based on the ordered seed set; and building, by the device, a set of one or more patterns of resource constraint faults and a set of one or more patterns of entity experience faults based on the augmented ordered seed set of the one or more microservices.

According to various embodiments, the above-described computer-implemented method can be implemented as a computer system or as a computer program product.

DESCRIPTION OF THE DRAWINGS

FIG. 7 illustrates a flow diagram of an example, non-limiting, computer implemented method that facilitates building of fingerprints in accordance with one or more embodiments described herein.

FIG. 9 illustrates an example, a non-limiting environment for the execution of at least some of the computer code in accordance with one or more embodiments described herein.

DETAILED DESCRIPTION

Figure 1:
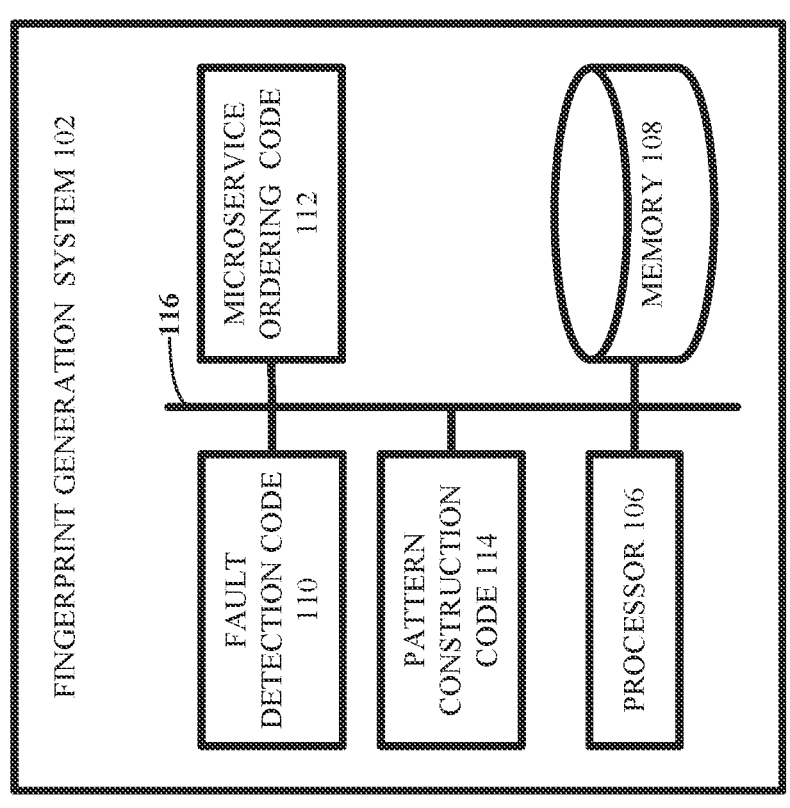
FIGS. 1 and 2 illustrate block diagrams of example, non-limiting, systems that facilitate fingerprint generation in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

As referenced herein, an "entity" can comprise a client, a user, a computing device, a software application, an agent, a machine learning (ML) model, an artificial intelligence (AI) model, and/or another entity.

One or more embodiments are now described with reference to the drawings, where like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

According to an embodiment, a computer-implemented method is provided. The computer-implemented method comprises determining, by a device operatively coupled to a processor, fault proneness of one or more microservices regarding one or more fault categories; generating, by the device, an ordered seed set of the one or more microservices based on the determined fault proneness; generating, by the device, an augmented ordered seed set of the one or more microservices based on topological relationships of the one or more microservices and based on the ordered seed set; and building, by the device, a set of one or more patterns of resource constraint faults and a set of one or more patterns of entity experience faults based on the augmented ordered seed set of the one or more microservices.

In one or more embodiments, the aforementioned computer-implemented method further comprises building, by the device, one or more data fingerprints from the set of one or more patterns of resource constraint faults and the set of one or more patterns of entity experience faults; and training, by the device, a machine learning model to detect fault scenarios using the one or more data fingerprints as training data.

In one or more embodiments of the aforementioned computer-implemented method, the determining the fault proneness and the generating the ordered seed set of the one or more microservices comprises simulating, by the device, varied resource loads for the one or more microservices; generating, by the device, a timeseries of performance metrics for the load values of the varied resource loads; transforming, by the device, the timeseries of performance metrics into velocity timeseries and acceleration timeseries, wherein velocity is a change of metric values in consecutive timestamps and wherein acceleration is a change in velocity of consecutive timestamps; and generating, by the device, the ordered seed set of the one or more microservices based on the acceleration timeseries of the one or more microservices.

In one or more embodiments of the aforementioned computer-implemented method, the generating the augmented ordered seed set of the one or more microservices comprises determining, by the device, microservices where a fault is likely to propagate based on the topological relationships of the one or more microservices and amount of communication between the one or more microservices; and updating, by the device, the ordered seed set based on the determined microservices.

In one or more embodiments of the aforementioned computer-implemented method, the building of the set of one or more patterns of resource constraint faults comprises identifying, by the device, user flows of the one or more microservices from the augmented ordered seed set; and injecting, by the device, faults to which the one or more microservices of the user flows are prone based on the augmented ordered seed set of the one or more microservices.

In one or more embodiments of the aforementioned computer-implemented method, the building the set of one or more patterns of entity experience faults comprises determining, by the device, entity experience metrics of a gateway microservice of the one or more microservices; identifying, by the device, one or more fault categories that correspond to the entity experience metrics; injecting, by the device, the one or more identified fault categories into the gateway microservice; and injecting, by the device, faults to which non-gateway microservices in a user flow are prone based on the augmented ordered seed set of the one or more microservices.

Within the microservice architecture, ensuring robust and well-designed systems can be challenging due to the potentially large number of microservices and the connections and dependencies between microservices. For example, high memory usage in one microservice may cause other errors or high resource use in connected microservices. Accordingly, artificial intelligence for IT operations (AIOS) has become increasingly attractive to track and address faults or errors experienced by users in microservice architectures. AIOS operates by using fingerprints as training data in order to catch learned or similar anomalies in microservice infrastructures. As used herein, "fingerprints" refer to mathematical representations of a system's overall state. Fingerprints are built through alerts, anomalies, metrics and/or traces. Building fingerprints for microservice applications provide several challenges. For example, some errors or faults may only manifest over long periods of time. Fault injection, the process of purposely causing or simulating specific faults, can be utilized to induce anomalies that can then be used to generate fingerprints. However, due to the scale and interconnectivity of microservice systems, the possible faults and how those faults propagate through the system create a huge test space. Furthermore, in real-world use, faults may take significant amounts of time, months or even years, to propagate to other microservices. Accordingly, creating and storing fingerprints for all possible faults through trial and error requires a large amount of data storage and time, and may not be feasible for systems with a large number of microservices. Additionally, not all theoretical fingerprints are relevant to real-world use cases. For example, some theoretical fingerprints may not manifest during actual use of the application. If AIOS machine learning models are trained on all possible fingerprints, the large and varied training sample may negatively impact training and thus the ability of the model to accurately identify fault scenarios. Training on scenarios that are unlikely to occur also wastes computing processing and storage resources.

Embodiments described herein include computer systems, computer-implemented methods, and computer program products that identify and build significant application fingerprints, while limiting the search space of the total number of possible application fingerprints. Significant fingerprints refer to those that are likely to occur in real-world environments, as opposed to all theoretically possible fingerprints of an application. To identify and build significant fingerprints, the various embodiments described herein determine patterns of faults that are likely to occur together based on simulation data, and then simultaneously inject the faults into multiple microservices in the application to eliminate the time needed for natural fault progression. For example, in one or more embodiments, the present disclosure determines proneness of one or more fault categories on one or more microservices, generates an ordered seed set of the one or more microservices by the fault categories, augments the ordered seed set based on topological relationships of the one or more microservices, and builds a set of patterns of resource constraint faults and entity experience faults based on the augmented ordered seed set. This allows for patterns to be constructed based on the dependencies of microservices within the application, to what types of errors the individual microservices are prone, and what types of errors are likely to occur during operation of the application. In one or more embodiments, these patterns of fault are then injected into simulations of the application and data collected from the microservices is used to generate fingerprints representative of the state of the application after fault injection. By generating a set of fingerprints that is focused on faults patterns that are likely to occur rather than all theoretically possible fault patterns, the training of AIOS models are better targeted, leading to better AIOS model performance. Furthermore, the methods described herein allow for generation of fingerprints in decreased time and with decreased memory and storage requirements in comparison to other methods.

Figure 2:
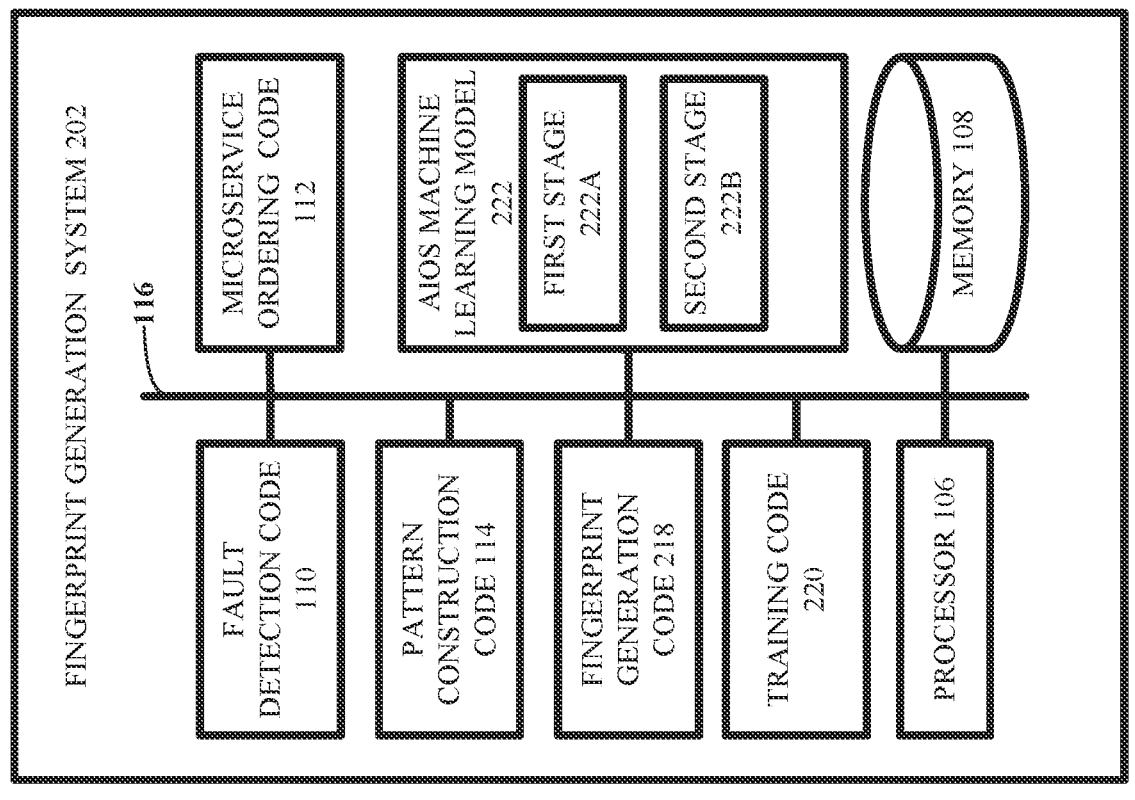

The embodiments depicted in one or more figures described herein are for illustration only, and as such, the architecture of embodiments is not limited to the systems, devices and/or computer-implemented operations depicted therein, nor to any particular order, connection and/or coupling of systems and/or devices depicted therein. For example, in one or more embodiments, the non-limiting systems described herein such as non-limiting systems 102 and 202 as illustrated at FIGS. 1 and 2, and/or systems thereof, further comprise, are associated with and/or are coupled to one or more computer and/or computing-based elements described herein with reference to an operating environment, such as the operating environment 900 illustrated at FIG. 9. For example, in one or more embodiments, non-limiting systems 102 and 202 are associated with, such as accessible via, a computing environment 900 described below with reference to FIG. 9, such that aspects of processing are distributed between non-limiting systems 102 or 202 and the computing environment 900. In one or more described embodiments, computer and/or computing based elements are used in connection with implementing one or more of the systems, devices and/or computer-implemented operations shown and/or described in connection with FIGS. 1, 2 and/or with other figures described herein.

FIGS. 1 and 2 illustrate block diagrams of example, non-limiting systems 102 and 202 that facilitate fingerprint generation in accordance with one or more embodiments described herein.

In various embodiments, non-limiting systems 102 and 202 are employed to use hardware and/or software to solve problems that are highly technical in nature (e.g., related to machine learning, application states of microservice applications, interdependencies of microservices within an application, etc.), that are not abstract and that cannot be performed as a set of mental acts by a human. Further, some of the processes performed may be performed by specialized computers to carry out defined tasks related to employing simultaneous fault injection to address generation of significant application fingerprints. In various embodiments, systems 102 and 202 are employed to solve new problems that arise through advancements in technologies mentioned above, and/or the like. Systems 102 and 202 provide technical improvements to AIOS machine learning systems, by improving the efficiency of generation of training data (e.g., data fingerprints) and improving the performance of AIOS machine learning systems by creating training data that is targeted to application states that are likely to occur in real-world use.

Discussion turns briefly to processor 106 and memory 108 of systems 102 and 202. For example, in one or more embodiments, system 102 comprises processor 106 (e.g., computer processing unit, microprocessor, classical processor, and/or like processor). In one or more embodiments, systems 102 and 202, as described herein with or without reference to the one or more figures of the one or more embodiments, further comprises one or more computer and/or machine readable, writable and/or executable instructions that are executed by processor 106 to enable performance of one or more processes defined by such instruction(s).

In one or more embodiments, systems 102 and 202 comprise a computer-readable memory (e.g., memory 108) operatively connected to processor 106. In various embodiments, memory 108 stores computer-executable instructions that, upon execution by processor 106, cause processor 106 and/or one or more machine learning model or computer executable code blocks (e.g., fault detection code 110, microservice ordering code 112, pattern construction code 114, fingerprint generation code 218, training code 220, and/or AIOS machine learning model 222) to perform one or more actions. In one or more embodiments, memory 108 stores machine learning models and computer executable code blocks (e.g., fault detection code 110, microservice ordering code 112, pattern construction code 114, fingerprint generation code 218, training code 220, and/or AIOS machine learning model 222).

In various embodiments, systems 102 and 202 and/or a machine learning model or computer executable code thereof as described herein, are communicatively coupled, electrically, operatively, optically and/or otherwise coupled to one another via a bus 116. In various embodiments, bus 116 comprises one or more of a memory bus, memory controller, peripheral bus, external bus, local bus, and/or another type of bus that employs one or more bus architectures. In various embodiments, one or more of these examples of buses are employed. In one or more embodiments, systems 102 and 202 are coupled (e.g. communicatively, electrically, operatively, optically and/or like function) to one or more external systems (e.g., a non-illustrated electrical output production system, one or more output targets, and output target controller and/or the like), sources and/or devices (e.g., classical computing devices, communication devices and/or like devices), such as via a network. In one or more embodiments, one or more of the machine learning models and computer executable codes of systems 102 and 202 reside in the cloud, and/or reside locally in a local computing environment (e.g., at a specified location(s)).

As described above, in various embodiments, systems 102 and 202 comprise one or more computer and/or machine readable, writable and/or executable instructions that, when executed by processor 106, enable performance or one or more operations defined by such instructions(s). For example, in various embodiments, fault detection code 110 determines fault proneness of one or more microservices regarding one or more fault categories and generates an ordered seed set of the one or more microservices based on the determined fault proneness. As used herein, the phrase "seed set" refers to a list of one or more microservices. The present embodiments include generating an ordered seed set, with the listed one or more microservices being ordered within the ordered seed set based on their determined fault proneness regarding one or more fault categories. As used herein, "fault proneness" refers to the likelihood of a type or category of fault manifesting. Accordingly, automated determinations of which microservices are most likely to suffer faults of specific types and under what conditions the faults occur are made. For embodiments in which an initial ordered seed set relates to a single microservice, then the ordering in the ordered seed set refers to a ranking of the respective fault proneness of that single microservice with respect to multiple fault categories, e.g., with a first fault category listed first to which that microservice is most prone, a second fault category listed second to which that microservice is second most prone, etc.

In one embodiment, systems 102 and/or 202 receive an application simulation, the individual microservices comprising the application, and a mechanism to obtain runtime metrics for the individual microservices. These runtime metrics comprise both resource usage of the microservices (e.g., processor usage, memory usage, etc.) and entity experience metrics (e.g., how responsive the microservice is, how long results take to generate, etc.). Since microservices are scaled relatively easily, fault-proneness of a microservice is also scaled accordingly, assuming that available computing resources are also scaled. In the simulation environment, for a given configuration of resource availability, fault detection code 110 varies the user load (e.g., how many simulated users are accessing the microservice and what are they requesting). Fault detection code 110 then creates timeseries of the runtime metrics for the load values simulated. For the microservices, the fault detection code 110 transforms the timeseries into two different timeseries for the metrics. The two different timeseries are velocity and acceleration. Velocity is the change of the metric values between consecutive timestamps. Acceleration is the change in velocity of consecutive timestamps. As different microservices are susceptible to different fault types, the velocity and acceleration timeseries will vary from microservice to microservice. In one or more embodiments, if the acceleration timeseries for a microservice shows a spike in usage of a resource above a threshold value specified by an entity, the microservice is prone to a fault category associated with the resource. For example, if the acceleration timeseries for a microservice shows a large increase in a CPU usage metric, the microservice is likely prone to CPU category faults such as CPU saturation. Fault categories include, but are not limited to, CPU faults, memory faults, and network faults.

Fault detection code 110 then generates an ordered seed set of the microservices by fault category. For example, given a fault category of high CPU usage, microservices are ordered from highest CPU usage acceleration to lowest CPU acceleration and so on for the fault categories. Accordingly, this ordered seed set then represents an ordering of how prone the microservices are to various fault categories.

In one or more embodiments, microservice ordering code 112 generates an augmented seed set of the one or more microservices based on topological relationships of the one or more microservices. As used herein, the phrase "augmented ordered seed set" refers to an extension of an ordered seed set, wherein the extension includes information about dependencies of microservices. Thus, the augmented ordered seed set in some embodiments lists other microservices in the application that were not present in the ordered seed set and that depend on one or more of the microservices in the ordered seed set. The augmented ordered seed set in some embodiments lists the same microservices that were listed in the ordered seed set, but with additional information about how those same microservices depend on each other, Accordingly, an automated determination of where faults are likely to propagate based on microservice dependencies and how often those dependencies are utilized is made. Given the ordered seed set generated by fault detection code 110 and the topology (e.g., the dependencies) of the microservices of application, microservice ordering code 112 outputs an augmented ordered seed set of the one or more microservices. For example, if a first microservice depends, e.g., depends directly, on a second microservice, then a fault in the second microservice is likely to propagate or cause a fault in the second microservice. For respective microservices in the fault categories, microservice ordering code 112 specifies where other microservices faults are likely to spread starting from the microservices in the ordered set. An augmented ordered seed set is then generated that includes where faults of specific microservices are likely to propagate.

Figure 4:
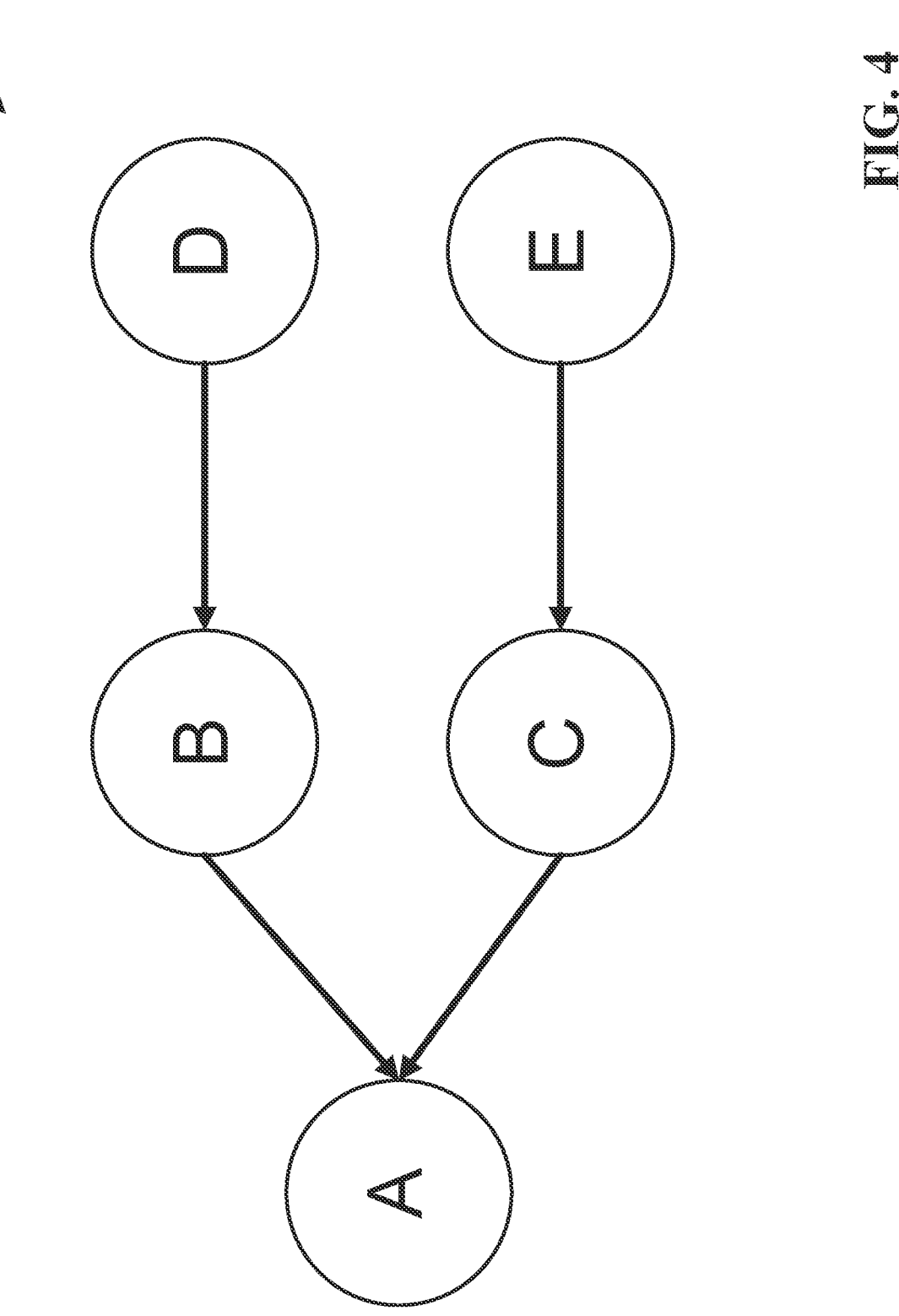
FIG. 4 illustrates a non-limiting example of application topology in accordance with one or more embodiments described herein.

Turning to FIG. 4, an example of an application topology 400 is provided. For example, given that microservice is E is CPU intensive, as determined by fault detection code 110, microservice ordering code 112 determines from which other microservices data should be collected when a CPU saturation fault is injected into microservice E. In this example, microservice B depends on microservice D, microservice C depends on microservice E, and microservice A depends on both B and C. In order to build patterns for fingerprint generation, data should only be collected from microservice where the fault will likely spread or cause other issues. Accordingly, as A depends on C and C depends on E, microservice ordering code 112 determines that if a fault is injected into E, data collection should be limited to E, C and A as the fault can propagate to C and A based on dependency. Similarly, if a fault is injected into C, data collection should be limited to C and A. Therefore, an augmented ordered seed set for application topology 400 specifies that if a fault is injected into E, data will be collected from E, C and A. Furthermore, in one or more embodiments, the weight of dependencies between microservices are considered. For example, while microservice A depends on both microservices B and C, microservice A may interact with microservice B more than it does with microservice C. Accordingly, the augmented ordered seed set specifies that errors are more likely to propagate from microservice B to microservice A, than from microservice C to microservice A. In one or more embodiments, the weight of dependencies is represented as a number, wherein if the weight dependencies between two microservices is below an entity specified numerical threshold, then the dependency is ignored. Furthermore, in some embodiments, microservice ordering code 112 removes one or more microservice and fault category associations from the ordered seed set. For example, in one or more embodiments, microservice and fault category associations are removed based on how prone the microservice is to the fault category. If microservice A is resistant to a CPU saturation fault, that association is removed. In one or more embodiments, which fault/microservice associations are removed is based on the acceleration time series. For example, if a microservice/fault association has a maximum acceleration below a value defined by a user, the microservice/fault association is discarded.

In one or more embodiments, pattern construction code 114 builds a set of one or more patterns of resource constraint faults based on the augmented seed set of the one or more microservices. Pattern construction code 114 identifies optimal sets of fault injections and microservice patterns based on scenarios that simulate resource constraints. In one embodiment, pattern construction code 114 first finds all possible user flows from the topology of the application. Then, for the respective flows (e.g., sequence of microservices identified in the augmented ordered seed set) pattern construction code 114 injects the faults to which microservices in the flows are prone. This determination of which of the faults to select is based on the augmented ordered set of microservices. For example, using the application illustrated in FIG. 4, if the augmented ordered seed set defines microservice E as prone to CPU intensive faults and microservice C as prone to memory intensive faults, this represents microservice E likely experiencing CPU saturation and microservice C likely experiencing memory saturation when the system load increases. The fault pattern comprises a list of microservices organized based on the dependencies of the microservices and what fault should be injected into the microservices in the pattern.

In one or more embodiments, pattern construction code 114 also builds a set of patterns of entity experience faults based on entity experience metrics. For example, using the topology of the example application of FIG. 4, microservice A is the gateway microservice (e.g., the microservice with which users interact). An entity can experience latency or errors while trying to consume the application. Pattern construction code 114 determines the entity experience metrics using SLO (service level objective) definitions. In one embodiment these metrics comprise indicators such as latency, availability, accuracy and/or others. These metrics are then identified as belonging to specific fault categories. For the entity experience metrics defined at the gateway microservice, the causal metrics from other microservices are determined based a simulation of the user flows of the application. The user flows comprise a set of microservices that interact with one another based on the application topology. For example, if simulation shows that latency is caused by CPU saturation, then a CPU saturation fault is injected into microservice A, and faults are injected into other microservices that flow to A as determined by the augmented ordered seed set. The total number of patterns for an application is $m*2^n$, wherein n is the number of microservices and m is the number of possible faults. This total number of all possible patterns makes generation and training using the full sample space impossible. Accordingly, the pattern building and selection as described herein are used to identify and build a subset of the total patterns, based on the faults most likely to have large negative impacts, and based on the faults most likely to degrade the entity experience.

In one or more embodiments, fingerprint generation code 218 builds one or more data fingerprints from the set patterns of resource constraint faults and the set of patterns of entity experience faults. To generate the fingerprints, in some embodiments fingerprint generation code 218 simulates the fault patterns built by pattern construction code 114 by injecting the faults specified in the pattern into the appropriate microservices simultaneously. By injecting the faults simultaneously, this eliminates the time required for faults to propagate naturally. Fingerprint generation in decreased time and with decreased computer simulation resources is thereby made possible. After injection, fingerprint generation code 218 collects performance data metrics from one or more of the microservices in the fault pattern. These performance data metrics are organized as fingerprints along with the faults injected to produce the performance data metrics. As opposed to existing fingerprint generation that may produce fingerprints comprising data from all the microservices within an application, fingerprint generation code 218 generates smaller fingerprints that comprise data collected from specific microservices based on the injected fault patterns. For example, returning to FIG. 4, given a fault pattern comprising microservices A, B and D, data collection will be limited to microservices A, B and D. Accordingly, fingerprint generation code 218 builds fingerprints focused on the microservices that are experiencing faults, rather than all microservices in the application.

According to some embodiments, AIOS machine learning model 222 employs automated learning and reasoning procedures (e.g., the use of explicitly and/or implicitly trained statistical classifiers) in connection with performing inference and/or probabilistic determinations and/or statistical-based determinations in accordance with one or more aspects described herein.

For example, AIOS machine learning model 222 employs principles of probabilistic and decision theoretic inference to determine one or more responses based on information retained in a knowledge source database. In various embodiments, AIOS machine learning model 222 employs a knowledge source database comprising fingerprints generated by fingerprint generation code 218. Additionally, or alternatively, AIOS machine learning model 222 relies on predictive models constructed using machine learning and/or automated learning procedures. Logic-centric inference can also be employed separately or in conjunction with probabilistic methods. For example, decision tree learning is utilized to map observations about data retained in a knowledge source database to derive a conclusion as to a response whether a microservice application is exhibiting anomalous behavior.

As used herein, the term "inference" refers generally to the process of reasoning about or inferring states of the system, a code, a module, the environment, and/or assessments from one or more observations captured through events, reports, data, and/or through other forms of communication. Inference can be employed to identify a specific context or action, or can generate a probability distribution over states, for example. The inference can be probabilistic. For example, computation of a probability distribution over states of interest can be based on a consideration of data and/or events. The inference can also refer to techniques employed for composing higher-level events from one or more events and/or data. Such inference can result in the construction of new events and/or actions from one or more observed events and/or stored event data, whether or not the events are correlated in close temporal proximity, and whether the events and/or data come from one or several events and/or data sources. Various classification schemes and/or systems (e.g., support vector machines, neural networks, logic-centric production systems, Bayesian belief networks, fuzzy logic, data fusion engines, and so on) can be employed in connection with performing automatic and/or inferred action in connection with the disclosed aspects. Furthermore, the inference processes can be based on stochastic or deterministic methods, such as random sampling, Monte Carlo Tree Search, and so on.

The various aspects can employ various artificial intelligence-based schemes for carrying out various aspects thereof. For example, a process for determining whether a microservice application is exhibiting anomalous behavior and possible remedies for anomalous behavior, without interaction from the target entity, is enabled through an automatic classifier system and process.

A classifier is a function that maps an input attribute vector, x=(x1, x2, x3, x4, xn), to a confidence that the input belongs to a class. In other words, f(x)=confidence (class). Such classification can employ a probabilistic and/or statistical-based analysis (e.g., factoring into the analysis utilities and costs) to prognose or infer an action that should be employed to make a determination. The determination can include, but is not limited to, what faults various microservices may be exhibiting, and remedial actions to address the various faults.

A support vector machine (SVM) is an example of a classifier that can be employed. The SVM operates by finding a hypersurface in the space of possible inputs. The hypersurface attempts to split the triggering criteria from the non-triggering events. Intuitively, this makes the classification correct for testing data that can be similar, but not necessarily identical to training data. Other directed and undirected model classification approaches (e.g., naïve Bayes, Bayesian networks, decision trees, neural networks, fuzzy logic models, and/or probabilistic classification models) providing different patterns of independence can be employed. Classification as used herein, can be inclusive of statistical regression that is utilized to develop models of priority.

One or more aspects employs classifiers that are explicitly trained (e.g., through training data) as well as classifiers that are implicitly trained (e.g., by observing and recording target entity behavior, by receiving extrinsic information, and so on). For example, SVM's can be configured through a learning phase or a training phase within a classifier constructor and feature selection module. Thus, a classifier(s) can be used to automatically learn and perform a number of functions, including but not limited to, identifying anomalous behavior of various microservices within an application and remedies for the faults, based on fingerprints generated by fingerprint generation code 218. Furthermore, one or more aspects can employ machine learning models that are trained utilizing reinforcement learning. For example, penalty/reward scores can be assigned for various outputs generated by AIOS machine learning model 222 based on defined entity preferences. Accordingly, AIOS machine learning model 222 can learn via selecting options with lower penalties and/or higher rewards in order to reduce an overall penalty score and/or increase an overall reward score.

In one or more embodiments, training code 220 trains AIOS machine learning model 222 to detect anomalous behavior in the application. For example, the fingerprints associated with injected faults generated by fingerprint generation code 218 are utilized as training data for AIOS machine learning model 222. In this manner, AIOS machine learning model 222 is trained to identify types of faults within different microservices of the application based on collected data metrics. For example, in or more embodiments, AIOS machine learning model 222 is trained to make predictions on which faults caused the fingerprints in the training data. A comparison can then be made between the predicted faults and the faults injected to create the fingerprints in the training data. In some embodiments, the accuracy of the prediction can be utilized as a reward or penalty score for the AIOS machine learning model 222, wherein the model is trained to maximize a reward score or minimize a penalty score. In another embodiment, the accuracy of the predictions of the AIOS machine learning model 222 are utilized to update the cross-entropy loss of the machine learning model to improve performance.

In operation, AIOS machine learning model 222 receives data metrics from one or more microservices of the application during deployment. This gathered data is utilized to generate operation fingerprints of the application. If AIOS model 222 recognizes the part or all of the operation fingerprint as similar to one of the training fingerprints, AIOS machine learning model 222 triggers an alert specifying which microservices are suffering what types of faults. For example, if AIOS model 222 recognizes an operation fingerprint as similar to a trained fingerprint associated with a CPU saturation fault in microservice A and a memory leak fault in microservice B, AIOS model 222 generates an alert notifying technical support of the detected faults in the relevant microservices. In one or more embodiments, AIOS machine learning model 222 identifies information for a feedback re-training loop. For example, AIOS machine learning model 222 records the weight of dependencies (e.g., the amount of communication) between one or more microservices. In one embodiment, this data is sent to microservice ordering code 112, which updates the augmented ordered seed set with the new weight metrics. New patterns and fingerprints are generated to re-train the AIOS machine learning model 222. In some embodiments, AIOS machine learning model 222 includes a multistage machine learning model. For example, in some embodiments, AIOS machine learning model 222 comprises multiple individual stages of a larger multistage machine learning model, and one or more stages of the multistage machine learning model is executed by an individual machine learning model. For example, in an embodiment, a first stage 222A of the multistage machine learning model preprocesses gathered data metrics from the microservice application to generate an application fingerprint. A second stage 222B of the multistage machine learning model then determines if the application fingerprint matches an anomalous application state based on the training provided by training code 220.

A practical application of such an AIOS machine learning model is that it enables better resource management of microservice applications. For example, tracking operations metrics of applications with a large number of microservices and dependencies can be beyond the capabilities of a human being. AIOS machine learning model 222 can simultaneously track the operations metrics of all microservices within an application simultaneously, which is beyond the capability of a human being. Further, in some embodiments AIOS machine learning model 222 can make corrective decisions based on detected anomalous application states. If AIOS machine learning model 222 determines that an error in a first microservice is likely to propagate to a second microservice, AIOS machine learning model 222 then allocates additional computing resources to the first and/or second microservice to mitigate the fault. For example, if AIOS machine learning model 222 determines that a first microservice is experiencing a CPU saturation fault, AIOS machine learning model 222 can assign additional processor resources to the first microservice to prevent the fault from spreading to other microservices. In another example, if AIOS machine learning model 222 detects that high memory usage in a first microservice is likely to cascade and cause a CPU saturation fault in a second microservice, AIOS machine learning model 222 can proactively assign additional processor resources to the second microservice in order to prevent the CPU saturation fault from occurring, thereby improving performance of the microservice application.

Figure 3:
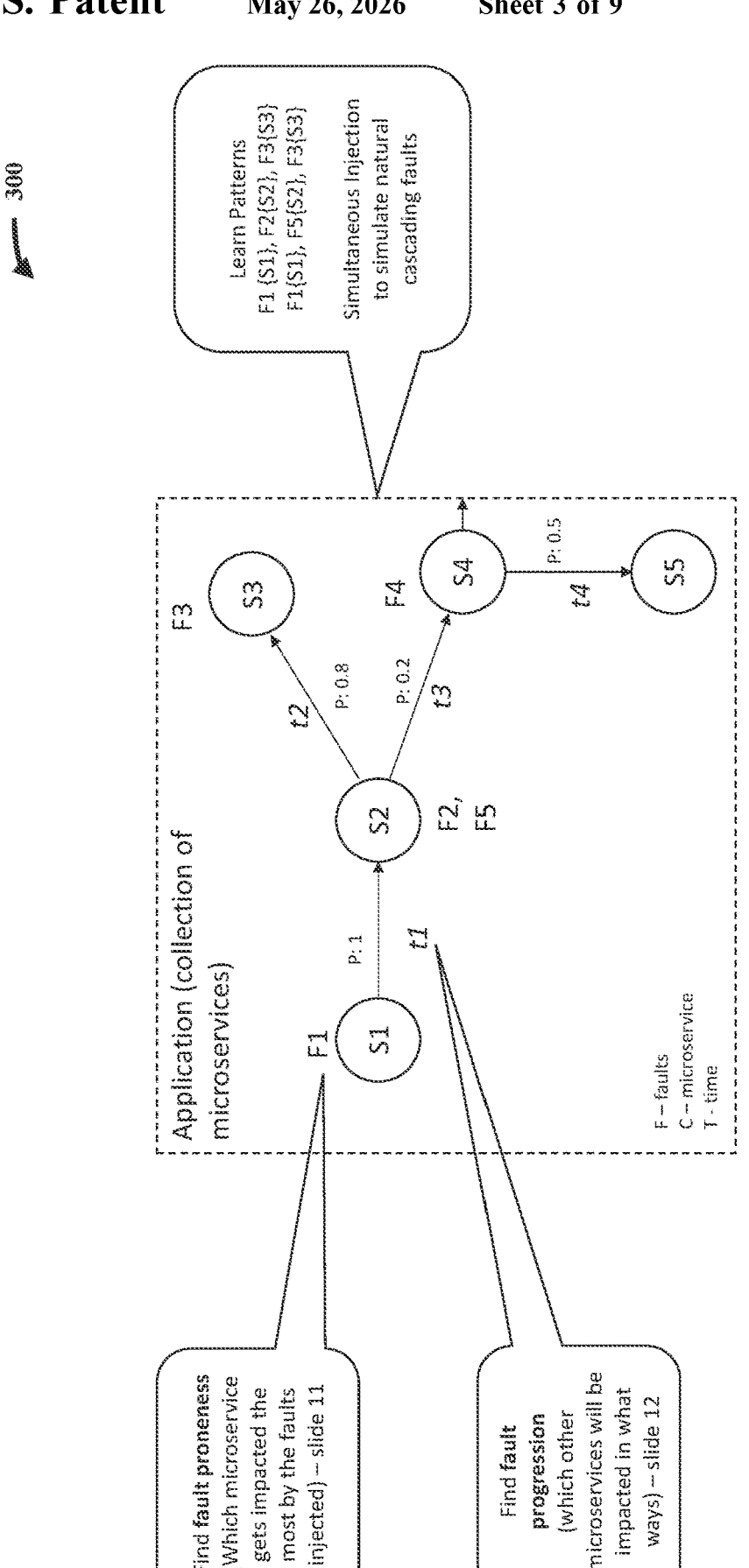
FIG. 3 illustrates a non-limiting example of a microservice application in accordance with one or more embodiments described herein.

FIG. 3 illustrates a non-limiting example of a microservice application 300 in accordance with one or more embodiments described herein. As shown, microservice system 300 comprises microservices S1, S2, S3, S4 and S5 wherein arrows represent the dependencies, alternatively referred to as the topology, of the system. For example, S2 depends on S1, S4 and S3 depend on S2, and S5 depends on S4. As shown, different microservices are prone to experience different faults. For example, S1 is prone to experience fault F1, S2 is prone to experience fault F2 and F5, S3 is prone to experience fault F3, and S4 is prone to experience fault F4. Further, these faults often propagate through the dependencies of the microservices causing additional faults. For example, as S2 depends on S1, fault F1 in S1 may propagate to cause faults F2 or F5 in S2, which may further propagate to cause faults F3 and F4 in S3 and S4, respectively. Accordingly, the patterns of these cascading faults are likely to occur during deployment and are utilized to generate fingerprints of the system. An example of a fault pattern is F1{S1}, F2{S2}, F3{S3}. While the example system shown only comprises five microservices, it should be appreciated that as the number of microservices and dependencies grows, the number of fault patterns also grows. Accordingly, the methods described herein enable determination of specific fault patterns that are most likely to occur and/or most likely to negatively impact performance or entity experience. By determining specific faults, the number of fingerprints that are stored, and thereby the storage requirements, are greatly decreased. Furthermore, by limiting the number of fingerprints, the training of AIOS machine learning models is targeted to scenarios that are both likely to occur, and most damaging.

Figure 5:
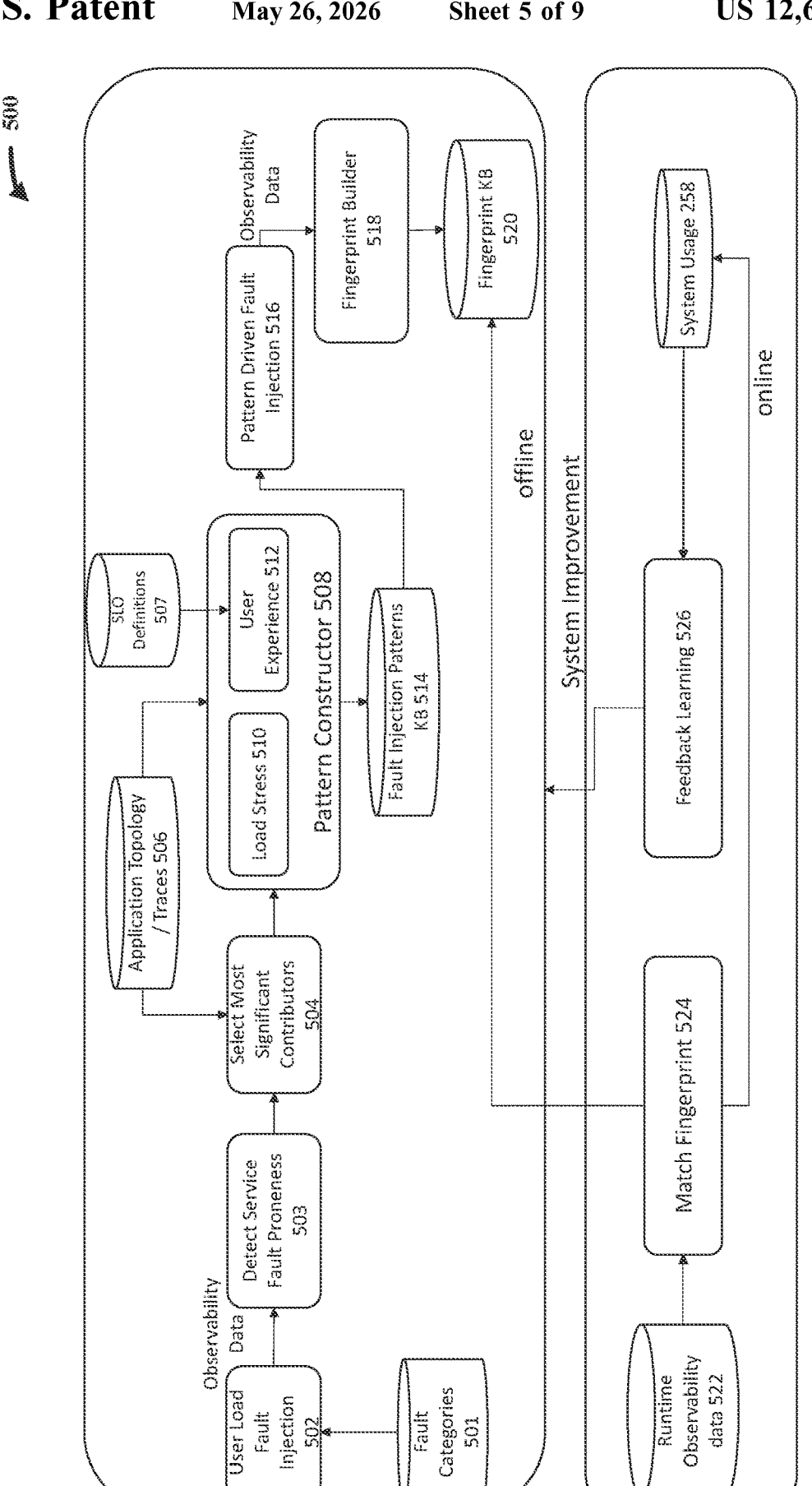
FIG. 5 illustrates a flow diagram of intelligent fingerprint generation in accordance with one or more embodiments described herein.

FIG. 5 illustrates a flow diagram of intelligent fingerprint generation in accordance with one or more embodiments described herein. At 501, a user defines the fault categories to be used. At 502, the user load is varied to generated velocity and acceleration time series as described above in relation to FIG. 1. At 503, the ordered seed set is generated based on the acceleration timeseries values for the microservice and fault category pairs. At 504, microservices and fault category pairs are selected based on high acceleration values and use the topology of the application to generate the augmented ordered seed set. At 508, the augmented ordered seed set, along with load stress 510 and entity experience metrics 512, are used to generate one or more patterns of resource constraint faults and one or more patterns of entity experience faults. At 516, the fault patterns are injected to generate data metrics that are collected to build one or more fingerprints at 518. At 520, the generated fingerprints are then stored in a fingerprint database. The generated fingerprints are utilized as training data for an AIOS machine learning model. At 522 the AIOS machine learning model observes the runtime data of the application. At 524, the AIOS machine learning model determines if the observed runtime data matches any of the anomalous behaviors learned from the fingerprints. If so, then the AIOS machine learning model outputs a notification of the suspected anomalies and/or faults. At 528, system usage data is used for feedback learning 526 to update/generate new fingerprints to retrain AIOS machine learning model. For example, if the system usage indicates that a new microservice has been added to the application, the fingerprint generation process is repeated including the new microservice. In another example, the amount of communication between various microservices is utilized to update the augmented ordered seed set to select user flows for pattern generation that are more likely to occur.

Figure 6:
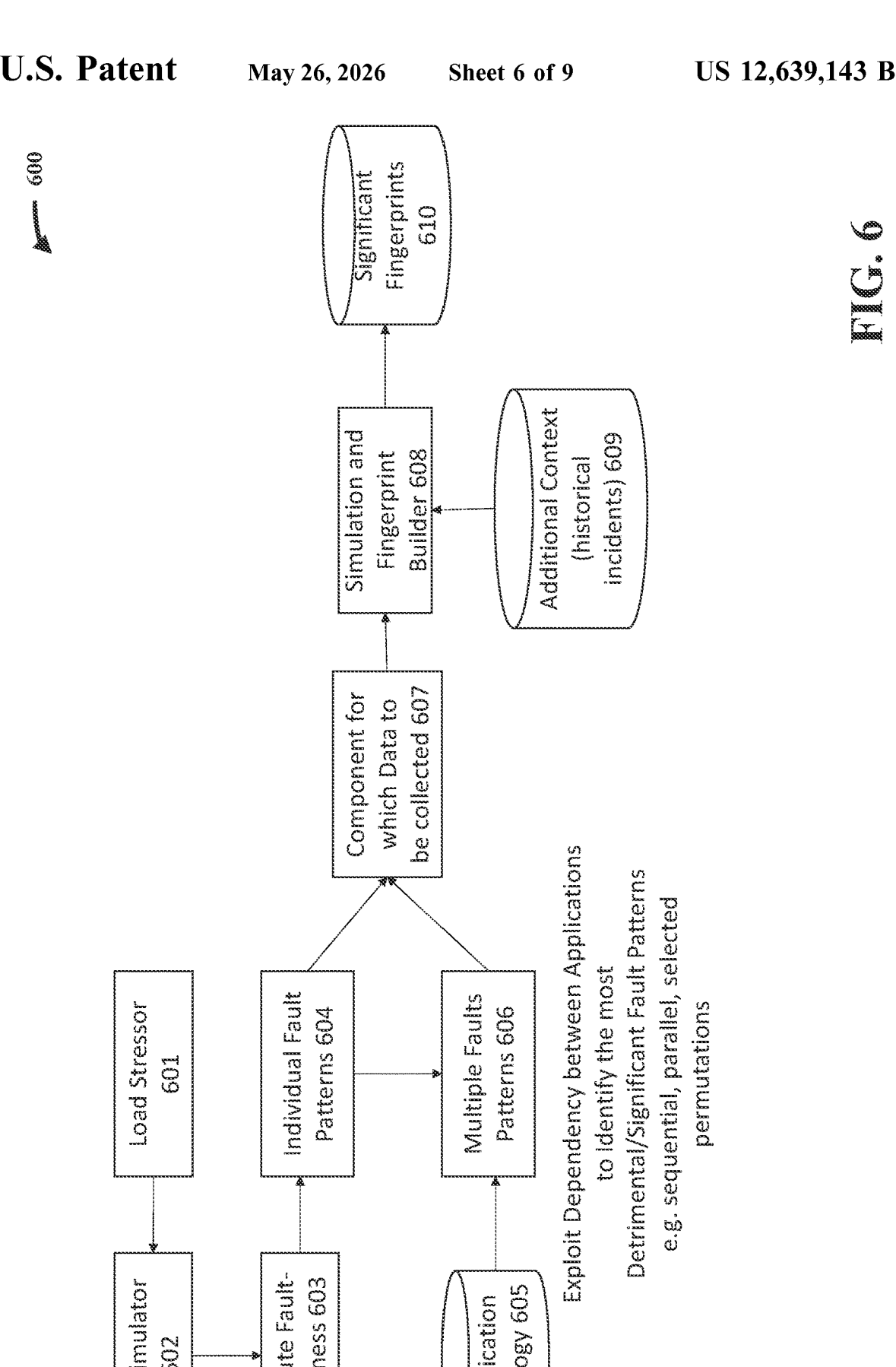
FIG. 6 illustrates a flow diagram of intelligent fingerprint generation in accordance with one or more embodiments as described herein.

FIG. 6 illustrates a flow diagram of intelligent fingerprint generation in accordance with one or more embodiments as described herein.

At 601 a load stressor varies the user load input to a simulation of the application. At 603, the fault proneness of one or more microservices of the application is determined as described above in relation to fault detection code 110. The application topology is then utilized at 605 in order to identify how dependencies may cascade through the microservices of the application. At 604 and 606 fault patterns are generated by pattern construction code 114 as described above in relation to FIG. 1. These patterns identify which faults to inject into which microservices and the microservices that should be monitored for data collection at 607 during and after injection of the faults. At 608, a simulation of the fault patterns is executed, and the data gathered is utilized to generate the fingerprints, e.g., significant fingerprints, at 610. At 609, additional context, e.g., historical incidents, are added to the patterns to assist with the generation of the significant fingerprints 610.

FIG. 7 illustrates a flow diagram of an example, non-limiting, computer implemented method 700 that facilitates building of fingerprints in accordance with one or more embodiments described herein.

At 702, method 700 comprises determining, by a device (e.g., systems 102, 202 and/or fault detection code 110) operatively coupled to a processor (e.g., processor 106), fault proneness of one or more microservices regarding one or more fault categories. For example, as described above in greater detail in reference to FIGS. 1 and 2, varied resource loads are simulated for the one or more microservices and timeseries of performance metrics for load values of the varied resource loads are generated. Then, for the one or more microservices, the timeseries of performance metrics are transformed into a velocity time series and an acceleration timeseries, wherein velocity is a change of metric values in consecutive timestamps and wherein acceleration is a change in velocity of consecutive timestamps. The ordered seed set of microservices are then generated based on the acceleration timeseries of the one or more microservices for the fault categories.

At 704, method 700 comprises generating, by the device (e.g., systems 102, 202 and/or microservice ordering code 112), an augmented ordered seed set of the one or more microservices based on topological relationships of the one or more microservices and based on the ordered seed set. For example, for the fault categories in the ordered seed set, microservices where a fault is likely to propagate is determined based on the topological relationships of the one or more microservices, and the ordered seed set is updated based on the determined microservices. Accordingly, the augmented seed set comprises an ordering of which microservices are prone to specific fault categories, and a list of which microservices should be monitored for fault propagation based on topology and dependencies of the application.

At 706, method 700 comprises building, by the device (e.g., systems 102, 202 and/or pattern construction code 114), a set of patterns of resource constraint faults and a set of patterns of entity experience faults based on the augmented ordered seed set of the one or more microservices. For example, the augmented ordered seed set is utilized to determine all possible user flows of the application. Then, for the flows, faults that the microservices in the flows are prone to are injected, in order to generate the pattern. Furthermore, entity experience metrics for the gateway microservice are defined. For the entity experience metrics defined at the gateway microservice, the causal metrics from other microservices are determined, based a simulation of user flows of the application. The user metrics are then assigned fault categories. For example, if simulation shows that latency is caused by CPU saturation, then a CPU saturation fault is injected into microservice A, and faults are injected into other microservices that flow to A based on the augmented ordered seed set.

At 708, method 700 comprises building, by the device (e.g., system 202 and/or fingerprint generation code 218), one or more data fingerprints from the set of patterns of resource constraint faults and the set of patterns of entity experience faults. For example, the fault patterns provided are simulated by simultaneously injecting the faults identified into the relevant microservices. This simulation is then utilized to capture data metrics of the microservices within the patterns to create the fingerprint.

At 710, method 700 comprises training, by the device (e.g., system 202 and/or training code 220), an AIOS machine learning model (e.g., AIOS machine learning model 222) to detect fault scenarios using the one or more data fingerprints as training data.

Figure 8:
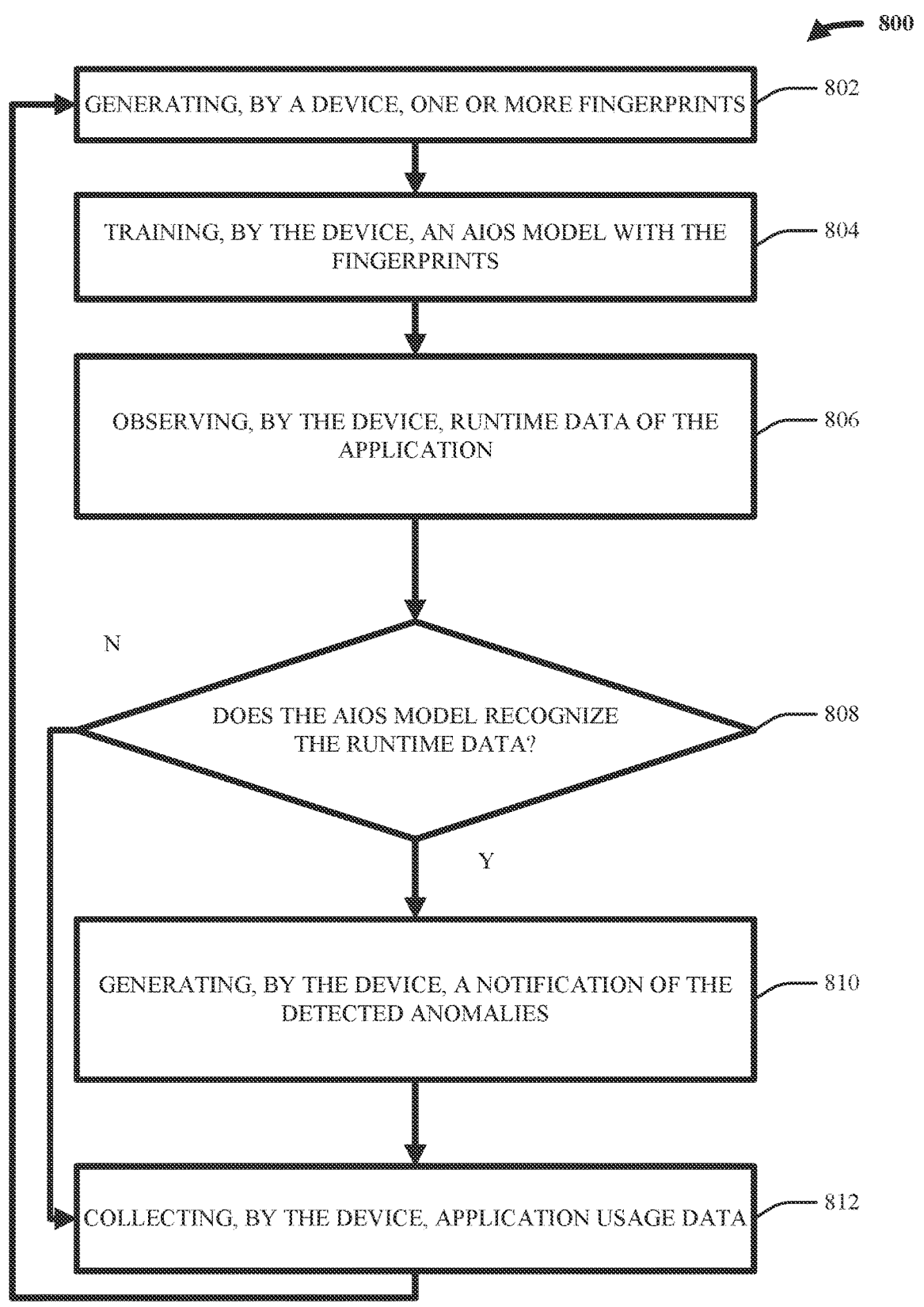
FIG. 8 illustrates a flow diagram of an example, non-limiting, computer implemented method that facilitates anomaly detection and feedback training of an AIOS machine learning model in accordance with one or more embodiments described herein.

FIG. 8 illustrates a flow diagram of an example, non-limiting, computer implemented method 800 that facilitates anomaly detection and feedback training of an AIOS machine learning model in accordance with one or more embodiments described herein.

At 802, method 800 comprises generating, by a device (e.g., system 202) operatively coupled to a processor (e.g., processor 106), one or more data fingerprints. For example, as described above in reference to FIGS. 1-2 and 7, fingerprints of anomalous behavior for an application are generated by determining proneness of microservices to different fault categories, generating user flows based on topology of the microservices of the application, and simultaneously injecting faults into the microservices in the user flows based on the proneness of the fault categories.

At 804, method 800 comprises training, by the device (e.g., system 202), an AIOS machine learning model to detect fault scenarios using the one or more data fingerprints as training data.

At 806, method 800 comprises observing, by the device (e.g., system 202), runtime data of the application. For example, data metrics are collected from one or more microservices of the application while the application is in use.

At 808, method 800 comprises determining, by the device (e.g., system 202), if the AIOS model recognizes the observed runtime data. For example, if the AIOS model recognizes the observed runtime data as similar to one of the learned fingerprints, it is likely that the application is suffering from the same faults in the same microservices utilized to generate the training fingerprints. If the AIOS model does not recognize the runtime data, then it is likely that the application is functioning normally. In response to a YES determination that the runtime data is recognized, method 800 proceeds to step 810 and the AIOS model generates a notification of the detected faults/anomalies. In response to a NO determination, method 800 proceeds to step 812.

At 812, method 800 comprise collecting, by the device (e.g., system 202), application usage data. For example, data regarding how often specific microservices communicate with one another, the addition of new microservices, a change in topology, a change in gateway microservice, and/or application use data are collected. Method 800 then returns to step 802 to generate new fingerprints using the application usage data and the training of the AIOS model is updated. For example, if a new microservice has been added to the application, a determination of how prone the new microservice is to different fault categories is made, and the topology of how the new microservice fits into the application is used to generate updated user flows, which in turn are used to generate updated fault injection patterns and fingerprints.

Fingerprint generation systems 102 and 202 provide technical improvements to hardware associated with fingerprint generation system 102. For example, by restricting the number of fingerprints generated, the overall number of fingerprints that are stored is decreased, thereby decreasing the workload of the memory and persistent storage associated with fingerprint generation systems 102 and 202. Furthermore, by simultaneously injecting faults to generate fingerprints, fingerprints are generated faster than waiting for faults to propagate naturally. This enables fingerprints to be generated with decreased amounts of simulation time, thereby decreasing the workload of a processor associated with executing the simulations.

A practical application of fingerprint generation systems 102 and 202 is that they enable better training of AIOS models utilized to recognize anomalous behavior in applications. For example, if an AIOS model is trained on all possible fingerprints, the large amount of training data can lead to confusion of the AIOS model, leading to poor results in detection of anomalous behavior. In contrast, by limiting the training data to fingerprints that are likely to occur, the training data size is constrained, thereby enabling more accurate training. Furthermore, by limiting the number of training fingerprints, training occurs faster, thereby leading to deployment of AIOS models that would otherwise take impractical amounts of time to train.

It is to be appreciated that fingerprint generation systems 102 and 202 can utilize various combination of electrical components, mechanical components, and circuitry that cannot be replicated in the mind of a human or performed by a human as the various operations that can be executed by fingerprint generation systems 102 and and/or components thereof as described herein are operations that are greater than the capability of a human mind. For instance, the amount of data processed, the speed of processing such data, or the types of data processed by fingerprint generation systems 102 and 202 over a certain period of time can be greater, faster, or different than the amount, speed, or data type that can be processed by a human mind over the same period of time. According to several embodiments, fingerprint generation systems 102 and 202 can also be fully operational towards performing one or more other functions (e.g., fully powered on, fully executed, and/or another function) while also performing the various operations described herein. It should be appreciated that such simultaneous multi-operational execution is beyond the capability of a human mind. It should be appreciated that fingerprint generation systems 102 and can include information that is impossible to obtain manually by an entity, such as a human user. For example, the type, amount, and/or variety of information included in fingerprint generation systems 102 and 202 can be more complex than information obtained manually by an entity, such as a human user.

FIG. 9 and the following discussion are intended to provide a brief, general description of a suitable computing environment 900 in which one or more embodiments described herein can be implemented. For example, various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks can be performed in reverse order, as a single integrated step, concurrently or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium can be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include diskette, hard disk, random access memory (RAM), read-only memory (ROM), erasable programmable read-only memory (EPROM or Flash memory), static random-access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 900 contains an example of an environment for the execution of at least some of the computer code involved in performing the inventive methods, such as translation of an original source code based on a configuration of a target system by the fingerprint generation code 980. In addition to block 980, computing environment 900 includes, for example, computer 901, wide area network (WAN) 902, end user device (EUD) 903, remote server 904, public cloud 905, and private cloud 906. In this embodiment, computer 901 includes processor set 910 (including processing circuitry 920 and cache 921), communication fabric 911, volatile memory 912, persistent storage 913 (including operating system 922 and block 980, as identified above), peripheral device set 914 (including user interface (UI), device set 923, storage 924, and Internet of Things (IoT) sensor set 925), and network module 915. Remote server 904 includes remote database 930. Public cloud 905 includes gateway 940, cloud orchestration module 941, host physical machine set 942, virtual machine set 943, and container set 944.

COMPUTER 901 can take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 930. As is well understood in the art of computer technology, and depending upon the technology, performance of a computer-implemented method can be distributed among multiple computers and/or between multiple locations. On the other hand, in this presentation of computing environment 900, detailed discussion is focused on a single computer, specifically computer 901, to keep the presentation as simple as possible. Computer 901 can be located in a cloud, even though it is not shown in a cloud in FIG. 9. On the other hand, computer 901 is not required to be in a cloud except to any extent as can be affirmatively indicated.

PROCESSOR SET 910 includes one, or more, computer processors of any type now known or to be developed in the future. Processing circuitry 920 can be distributed over multiple packages, for example, multiple, coordinated integrated circuit chips. Processing circuitry 920 can implement multiple processor threads and/or multiple processor cores. Cache 921 is memory that is located in the processor chip package(s) and is typically used for data or code that should be available for rapid access by the threads or cores running on processor set 910. Cache memories are typically organized into multiple levels depending upon relative proximity to the processing circuitry. Alternatively, some, or all, of the cache for the processor set can be located "off chip." In some computing environments, processor set 910 can be designed for working with qubits and performing quantum computing.

Computer readable program instructions are typically loaded onto computer 901 to cause a series of operational steps to be performed by processor set 910 of computer 901 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 921 and the other storage media discussed below. The program instructions, and associated data, are accessed by processor set 910 to control and direct performance of the inventive methods. In computing environment 900, at least some of the instructions for performing the inventive methods can be stored in block 980 in persistent storage 913.

COMMUNICATION FABRIC 911 is the signal conduction path that allows the various components of computer 901 to communicate with each other. Typically, this fabric is made of switches and electrically conductive paths, such as the switches and electrically conductive paths that make up busses, bridges, physical input/output ports and the like. Other types of signal communication paths can be used, such as fiber optic communication paths and/or wireless communication paths.

VOLATILE MEMORY 912 is any type of volatile memory now known or to be developed in the future. Examples include dynamic type random access memory (RAM) or static type RAM. Typically, the volatile memory is characterized by random access, but this is not required unless affirmatively indicated. In computer 901, the volatile memory 912 is located in a single package and is internal to computer 901, but, alternatively or additionally, the volatile memory can be distributed over multiple packages and/or located externally with respect to computer 901.

PERSISTENT STORAGE 913 is any form of non-volatile storage for computers that is now known or to be developed in the future. The non-volatility of this storage means that the stored data is maintained regardless of whether power is being supplied to computer 901 and/or directly to persistent storage 913. Persistent storage 913 can be a read only memory (ROM), but typically at least a portion of the persistent storage allows writing of data, deletion of data and re-writing of data. Some familiar forms of persistent storage include magnetic disks and solid-state storage devices. Operating system 922 can take several forms, such as various known proprietary operating systems or open-source Portable Operating System Interface type operating systems that employ a kernel. The code included in block 980 typically includes at least some of the computer code involved in performing the inventive methods.

PERIPHERAL DEVICE SET 914 includes the set of peripheral devices of computer 901. Data communication connections between the peripheral devices and the other components of computer 901 can be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 923 can include components such as a display screen, speaker, microphone, wearable devices (such as goggles and smart watches), keyboard, mouse, printer, touchpad, game controllers, and haptic devices. Storage 924 is external storage, such as an external hard drive, or insertable storage, such as an SD card. Storage 924 can be persistent and/or volatile. In some embodiments, storage 924 can take the form of a quantum computing storage device for storing data in the form of qubits. In embodiments where computer 901 is required to have a large amount of storage (for example, where computer 901 locally stores and manages a large database) then this storage can be provided by peripheral storage devices designed for storing large amounts of data, such as a storage area network (SAN) that is shared by multiple, geographically distributed computers. IoT sensor set 925 is made up of sensors that can be used in Internet of Things applications. For example, one sensor can be a thermometer and another sensor can be a motion detector.

NETWORK MODULE 915 is the collection of computer software, hardware, and firmware that allows computer 901 to communicate with other computers through WAN 902. Network module 915 can include hardware, such as modems or Wi-Fi signal transceivers, software for packetizing and/or de-packetizing data for communication network transmission, and/or web browser software for communicating data over the internet. In some embodiments, network control functions and network forwarding functions of network module 915 are performed on the same physical hardware device. In other embodiments (for example, embodiments that utilize software-defined networking (SDN)), the control functions and the forwarding functions of network module 915 are performed on physically separate devices, such that the control functions manage several different network hardware devices. Computer readable program instructions for performing the inventive methods can typically be downloaded to computer 901 from an external computer or external storage device through a network adapter card or network interface included in network module 915.

WAN 902 is any wide area network (for example, the internet) capable of communicating computer data over non-local distances by any technology for communicating computer data, now known or to be developed in the future. In some embodiments, the WAN can be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 903 is any computer system that is used and controlled by an end user (for example, a customer of an enterprise that operates computer 901) and can take any of the forms discussed above in connection with computer 901. EUD 903 typically receives helpful and useful data from the operations of computer 901. For example, in a hypothetical case where computer 901 is designed to provide a recommendation to an end user, this recommendation would typically be communicated from network module 915 of computer 901 through WAN 902 to EUD 903. In this way, EUD 903 can display, or otherwise present, the recommendation to an end user. In some embodiments, EUD 903 can be a client device, such as thin client, heavy client, mainframe computer and/or desktop computer.

REMOTE SERVER 904 is any computer system that serves at least some data and/or functionality to computer 901. Remote server 904 can be controlled and used by the same entity that operates computer 901. Remote server 904 represents the machine(s) that collect and store helpful and useful data for use by other computers, such as computer 901. For example, in a hypothetical case where computer 901 is designed and programmed to provide a recommendation based on historical data, then this historical data can be provided to computer 901 from remote database 930 of remote server 904.

PUBLIC CLOUD 905 is any computer system available for use by multiple entities that provides on-demand availability of computer system resources and/or other computer capabilities, especially data storage (cloud storage) and computing power, without direct active management by the scale. The direct and active management of the computing resources of public cloud 905 is performed by the computer hardware and/or software of cloud orchestration module 941. The computing resources provided by public cloud 905 are typically implemented by virtual computing environments that run on various computers making up the computers of host physical machine set 942, which is the universe of physical computers in and/or available to public cloud 905. The virtual computing environments (VCEs) typically take the form of virtual machines from virtual machine set 943 and/or containers from container set 944. It is understood that these VCEs can be stored as images and can be transferred among and between the various physical machine hosts, either as images or after instantiation of the VCE. Cloud orchestration module 941 manages the transfer and storage of images, deploys new instantiations of VCEs and manages active instantiations of VCE deployments. Gateway 940 is the collection of computer software, hardware and firmware allowing public cloud 905 to communicate through WAN 902.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 906 is similar to public cloud 905, except that the computing resources are only available for use by a single enterprise. While private cloud 906 is depicted as being in communication with WAN 902, in other embodiments a private cloud can be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 195 and private cloud 196 are both part of a larger hybrid cloud. The embodiments described herein can be directed to one or more of a system, a method, an apparatus and/or a computer program product at any possible technical detail level of integration. The computer program product can include a computer readable storage medium (or media) having computer readable program instructions thereon for causing a processor to carry out aspects of the one or more embodiments described herein. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a superconducting storage device and/or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon and/or any suitable combination of the foregoing. A computer readable storage medium, as used herein, is not to be construed as being transitory signals per se, such as radio waves and/or other freely propagating electromagnetic waves, electromagnetic waves propagating through a waveguide and/or other transmission media (e.g., light pulses passing through a fiber-optic cable), and/or electrical signals transmitted through a wire.

Computer readable program instructions described herein can be downloaded to respective computing/processing devices from a computer readable storage medium and/or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the one or more embodiments described herein can be assembler instructions, instruction-set-architecture (ISA) instructions, machine instructions, machine dependent instructions, microcode, firmware instructions, state-setting data, configuration data for integrated circuitry, and/or source code and/or object code written in any combination of one or more programming languages, including an object oriented programming language such as Smalltalk, C++ or the like, and/or procedural programming languages, such as the "C" programming language and/or similar programming languages. The computer readable program instructions can execute entirely on a computer, partly on a computer, as a stand-alone software package, partly on a computer and/or partly on a remote computer or entirely on the remote computer and/or server. In the latter scenario, the remote computer can be connected to a computer through any type of network, including a local area network (LAN) and/or a wide area network (WAN), and/or the connection can be made to an external computer (for example, through the Internet using an Internet Service Provider). In one or more embodiments, electronic circuitry including, for example, programmable logic circuitry, field-programmable gate arrays (FPGA) and/or programmable logic arrays (PLA) can execute the computer readable program instructions by utilizing state information of the computer readable program instructions to personalize the electronic circuitry, in order to perform aspects of the one or more embodiments described herein.

Aspects of the one or more embodiments described herein are described with reference to flowchart illustrations and/or block diagrams of methods, apparatus (systems), and computer program products according to one or more embodiments described herein. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general-purpose computer, special purpose computer and/or other programmable data processing apparatus to produce a machine, such that the instructions, which execute via the processor of the computer or other programmable data processing apparatus, can create means for implementing the functions/acts specified in the flowchart and/or block diagram block or blocks. These computer readable program instructions can also be stored in a computer readable storage medium that can direct a computer, a programmable data processing apparatus and/or other devices to function in a particular manner, such that the computer readable storage medium having instructions stored therein can comprise an article of manufacture including instructions which can implement aspects of the function/act specified in the flowchart and/or block diagram block or blocks. The computer readable program instructions can also be loaded onto a computer, other programmable data processing apparatus and/or other device to cause a series of operational acts to be performed on the computer, other programmable apparatus and/or other device to produce a computer implemented process, such that the instructions which execute on the computer, other programmable apparatus and/or other device implement the functions/acts specified in the flowchart and/or block diagram block or blocks.

The flowcharts and block diagrams in the figures illustrate the architecture, functionality and/or operation of possible implementations of systems, computer-implementable methods and/or computer program products according to one or more embodiments described herein. In this regard, each block in the flowchart or block diagrams can represent a module, segment and/or portion of instructions, which comprises one or more executable instructions for implementing the specified logical function. In one or more alternative implementations, the functions noted in the blocks can occur out of the order noted in the Figures. For example, two blocks shown in succession can be executed substantially concurrently, and/or the blocks can sometimes be executed in the reverse order, depending upon the functionality involved. It will also be noted that each block of the block diagrams and/or flowchart illustration, and/or combinations of blocks in the block diagrams and/or flowchart illustration, can be implemented by special purpose hardware-based systems that can perform the specified functions and/or acts and/or carry out one or more combinations of special purpose hardware and/or computer instructions.

While the subject matter has been described above in the general context of computer-executable instructions of a computer program product that runs on a computer and/or computers, those skilled in the art will recognize that the one or more embodiments herein also can be implemented at least partially in parallel with one or more other program modules. Generally, program modules include routines, programs, components and/or data structures that perform particular tasks and/or implement particular abstract data types. Moreover, the aforedescribed computer-implemented methods can be practiced with other computer system configurations, including single-processor and/or multiprocessor computer systems, mini-computing devices, mainframe computers, as well as computers, hand-held computing devices (e.g., PDA, phone), and/or microprocessor-based or programmable consumer and/or industrial electronics. The illustrated aspects can also be practiced in distributed computing environments in which tasks are performed by remote processing devices that are linked through a communications network. However, one or more, if not all aspects of the one or more embodiments described herein can be practiced on stand-alone computers. In a distributed computing environment, program modules can be located in both local and remote memory storage devices.

As used in this application, the terms "component," "system," "platform" and/or "interface" can refer to and/or can include a computer-related entity or an entity related to an operational machine with one or more specific functionalities. The entities described herein can be either hardware, a combination of hardware and software, software, or software in execution. For example, a component can be, but is not limited to being, a process running on a processor, a processor, an object, an executable, a thread of execution, a program and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system and/or across a network such as the Internet with other systems via the signal). As another example, a component can be an apparatus with specific functionality provided by mechanical parts operated by electric or electronic circuitry, which is operated by a software and/or firmware application executed by a processor. In such a case, the processor can be internal and/or external to the apparatus and can execute at least a part of the software and/or firmware application. As yet another example, a component can be an apparatus that provides specific functionality through electronic components without mechanical parts, where the electronic components can include a processor and/or other means to execute software and/or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter described herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit and/or device comprising, but not limited to, single-core processors; single-processors with software multithread execution capability; multi-core processors; multi-core processors with software multithread execution capability; multi-core processors with hardware multithread technology; parallel platforms; and/or parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, and/or any combination thereof designed to perform the functions described herein. Further, processors can exploit nano-scale architectures such as, but not limited to, molecular and quantum-dot based transistors, switches and/or gates, in order to optimize space usage and/or to enhance performance of related equipment. A processor can be implemented as a combination of computing processing units.

Herein, terms such as "store," "storage," "data store," data storage," "database," and substantially any other information storage component relevant to operation and functionality of a component are utilized to refer to "memory components," entities embodied in a "memory," or components comprising a memory. Memory and/or memory components described herein can be either volatile memory or nonvolatile memory or can include both volatile and non-volatile memory. By way of illustration, and not limitation, nonvolatile memory can include read only memory (ROM), programmable ROM (PROM), electrically programmable ROM (EPROM), electrically erasable ROM (EEPROM), flash memory and/or nonvolatile random-access memory (RAM) (e.g., ferroelectric RAM (FeRAM). Volatile memory can include RAM, which can act as external cache memory, for example. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SL-DRAM), direct Rambus RAM (DRRAM), direct Rambus dynamic RAM (DRDRAM) and/or Rambus dynamic RAM (RDRAM). Additionally, the described memory components of systems and/or computer-implemented methods herein are intended to include, without being limited to including, these and/or any other suitable types of memory.

What has been described above includes mere examples of systems and computer-implemented methods. It is, of course, not possible to describe every conceivable combination of components and/or computer-implemented methods for purposes of describing the one or more embodiments, but one of ordinary skill in the art can recognize that many further combinations and/or permutations of the one or more embodiments are possible. Furthermore, to the extent that the terms "includes," "has," "possesses," and the like are used in the detailed description, claims, appendices and/or drawings such terms are intended to be inclusive in a manner similar to the term "comprising" as "comprising" is interpreted when employed as a transitional word in a claim.

The descriptions of the various embodiments have been presented for purposes of illustration but are not intended to be exhaustive or limited to the embodiments described herein. Many modifications and variations will be apparent to those of ordinary skill in the art without departing from the scope and spirit of the described embodiments. The terminology used herein was chosen to best explain the principles of the embodiments, the practical application and/or technical improvement over technologies found in the marketplace, and/or to enable others of ordinary skill in the art to understand the embodiments described herein.

What is claimed is:

1. A computer-implemented method comprising:
    determining, by a device operatively coupled to a processor, fault proneness of one or more microservices regarding one or more fault categories;
    generating, by the device, an ordered seed set of the one or more microservices based on the determined fault proneness;

generating, by the device, an augmented ordered seed set of the one or more microservices based on topological relationships of the one or more microservices and based on the ordered seed set; and building, by the device, a set of one or more patterns of resource constraint faults and a set of one or more patterns of entity experience faults based on the augmented ordered seed set of the one or more microservices, wherein the building of the set of one or more patterns of resource constraint faults comprises injecting, by the device, faults to which the one or more microservices of user flows are prone based on the augmented ordered seed set of the one or more microservices.

2. The computer-implemented method of claim 1, further comprising:

building, by the device, one or more data fingerprints from the set of one or more patterns of resource constraint faults and the set of one or more patterns of entity experience faults; and training, by the device, a machine learning model to detect fault scenarios using the one or more data fingerprints as training data.

3. The computer-implemented method of claim 2, further comprising:

collecting, by the device, usage data for the one or more microservices;

updating, by the device, the one or more data fingerprints based on the usage data; and retraining, by the device, the machine learning model with the updated fingerprints.

4. The computer-implemented method of claim 1, wherein the determining the fault proneness and the generating the ordered seed set of the one or more microservices comprises:

simulating, by the device, varied resource loads for the one or more microservices;

generating, by the device, a timeseries of performance metrics for the load values of the varied resource loads;

transforming, by the device, the timeseries of performance metrics into velocity timeseries and acceleration timeseries, wherein velocity is a change of metric values in consecutive timestamps and wherein acceleration is a change in velocity of consecutive timestamps; and generating, by the device, the ordered seed set of the one or more microservices based on the acceleration timeseries of the one or more microservices.

5. The computer-implemented method of claim 1, wherein the generating the augmented ordered seed set of the one or more microservices comprises:

determining, by the device, microservices where a fault is likely to propagate based on the topological relationships of the one or more microservices and amount of communication between the one or more microservices; and updating, by the device, the ordered seed set based on the determined microservices.

6. The computer-implemented method of claim 1, wherein the building of the set of one or more patterns of resource constraint faults further comprises:

identifying, by the device, user flows of the one or more microservices from the augmented ordered seed set.

7. The computer-implemented method of claim 1, wherein the building the set of one or more patterns of entity experience faults comprises:

determining, by the device, entity experience metrics of a gateway microservice of the one or more microservices;

identifying, by the device, one or more fault categories that correspond to the entity experience metrics;

injecting, by the device, the one or more identified fault categories into the gateway microservice; and injecting, by the device, faults to which non-gateway microservices in a user flow are prone based on the augmented ordered seed set of the one or more microservices.

8. A computer system comprising:

a processor set:

a set of one or more computer-readable storage media; and program instructions, collectively stored in the set or one or more computer-readable storage media, to cause the processor set to perform computer operations comprising:

determining fault proneness of one or more microservices regarding one or more fault categories;

generating an ordered seed set of the one or more microservices based on the determined fault proneness;

generating an augmented ordered seed set of the one or more microservices based on topological relationships of the one or more microservices and based on the ordered seed set; and building a set of one or more patterns of resource constraint faults and a set of one or more patterns of entity experience faults based on the augmented ordered seed set of the one or more microservices, wherein the building of the set of one or more patterns of resource constraint faults comprises injecting faults to which the one or more microservices of the user flows are prone based on the augmented ordered seed set of the one or more microservices.

9. The system of claim 8, wherein the computer operations further comprise:

building one or more data fingerprints from the set of one or more patterns of resource constraint faults and the set of one or more patterns of entity experience faults; and training a machine learning model to detect fault scenarios using the one or more data fingerprints as training data.

10. The system of claim 8, wherein the determining the fault proneness and the generating the ordered seed set of the one or more microservices comprises:

simulating varied resource loads for the one or more microservices;

generating a timeseries of performance metrics for load values of the varied resource loads;

transforming the timeseries of performance metrics into velocity timeseries and acceleration timeseries, wherein velocity is a change of metric values in consecutive timestamps and wherein acceleration is a change in velocity of consecutive timestamps; and generating the ordered seed set of the one or more microservices based on the acceleration timeseries of the one or more microservices.

11. The system of claim 8, wherein the generating the augmented ordered seed set of the one or more microservices comprises:

determining microservices where a fault is likely to propagate based on the topological relationships of the one or more microservices and amount of communication between the one or more microservices; and updating the ordered seed set based on the determined microservices.

12. The system of claim 8, wherein the building of the set of one or more patterns of resource constraint faults further comprises:

identifying user flows of the one or more microservices from the augmented ordered seed set.

13. The system of claim 8, wherein building the set of one or more patterns of entity experience faults comprises:

determining entity experience metrics of a gateway microservice of the one or more microservices;

identifying one or more fault categories that correspond to the entity experience metrics;

injecting the one or more identified fault categories into the gateway microservice; and injecting faults to which non-gateway microservices in a user flow are prone based on the augmented ordered seed set of the one or more microservices.

14. A computer program product comprising a computer readable storage medium having program instructions embodied therewith, the program instructions executable by a processor to cause the processor to:

determine fault proneness of one or more microservices regarding one or more fault categories;

generate an ordered seed set of the one or more microservices based on the determined fault proneness;

generate an augmented ordered seed set of the one or more microservices based on topological relationships of the one or more microservices and based on the ordered seed set; and build, by the processor, a set of one or more patterns of resource constraint faults and a set of one or more patterns of entity experience faults based on the augmented ordered seed set of the one or more microservices, wherein the building of the set of one or more patterns of resource constraint faults comprises injecting faults wo which the one or more microservices of the user flows are prone based on the augmented ordered seed set of the one or more microservices.

15. The computer program product of claim 14, wherein the program instructions further cause the processor to:

build one or more data fingerprints from the set of one or more patterns of resource constraint faults and the set of one or more patterns of entity experience faults; and train a machine learning model to detect fault scenarios using one or more data fingerprints as training data.

16. The computer program product of claim 15, wherein the program instructions further cause the processor to:

collect usage data for the one or more microservices;

update the one or more fingerprints based on the usage data; and retrain the machine learning model with the updated fingerprints.

17. The computer program product of claim 14, wherein the determining the fault proneness and the generating the ordered seed set of the one or more microservices comprises:

simulating varied resource loads for the one or more microservices;

generating a timeseries of performance metrics for load values of the varied resource loads;

transforming the timeseries of performance metrics into velocity timeseries and acceleration timeseries, wherein velocity is a change of metric values in consecutive timestamps and wherein acceleration is a change in velocity of consecutive timestamps; and generating the ordered seed set of the one or more microservices based on the acceleration timeseries of the one or more microservices.

18. The computer program product of claim 14, wherein the generating the augmented ordered seed set of the one or more microservices comprises:

determining microservices where a fault is likely to propagate based on the topological relationships of the one or more microservices and amount of communication between the one or more microservices; and updating the ordered seed set based on the determined microservices.

19. The computer program product of claim 14, wherein the building of the set of one or more patterns of resource constraint faults further comprises:

identifying user flows of the one or more microservices from the augmented ordered seed set.

20. The computer program product of claim 14, wherein building the set of one or more patterns of entity experience faults comprises:

determining entity experience metrics of a gateway microservice of the one or more microservices;

identifying one or more fault categories that correspond to the entity experience metrics;

injecting the one or more identified fault categories into the gateway microservice; and injecting faults to which non-gateway microservices in a user flow is prone based on the augmented ordered seed set of the one or more microservices.

* * * * *